H. L. DUXSTAD.
TETHER.
APPLICATION FILED AUG. 7, 1912.
1,060,439.
Patented Apr. 29, 1913.
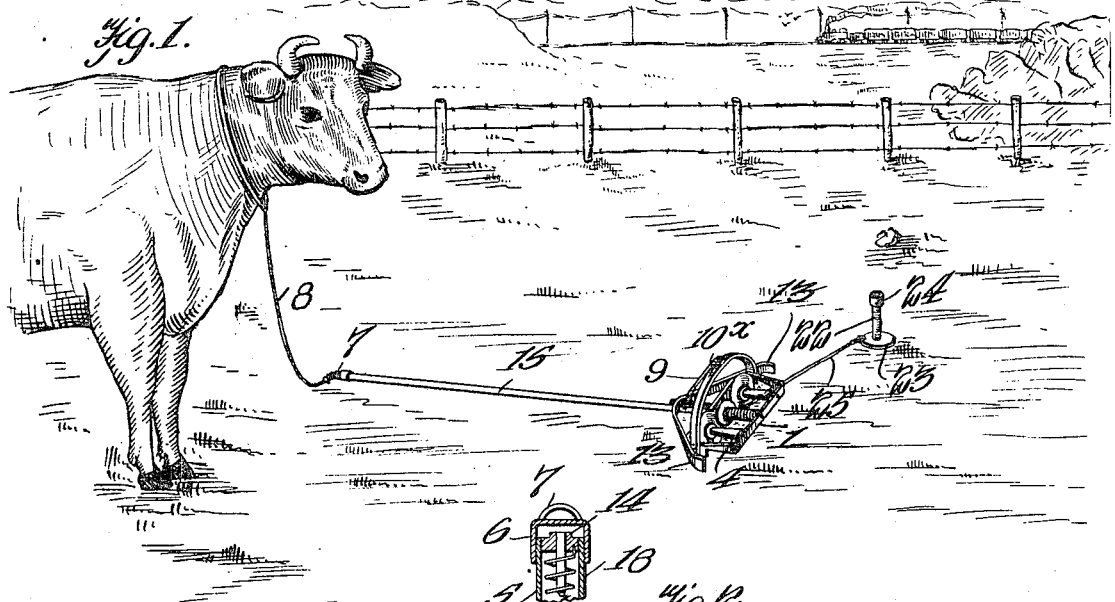
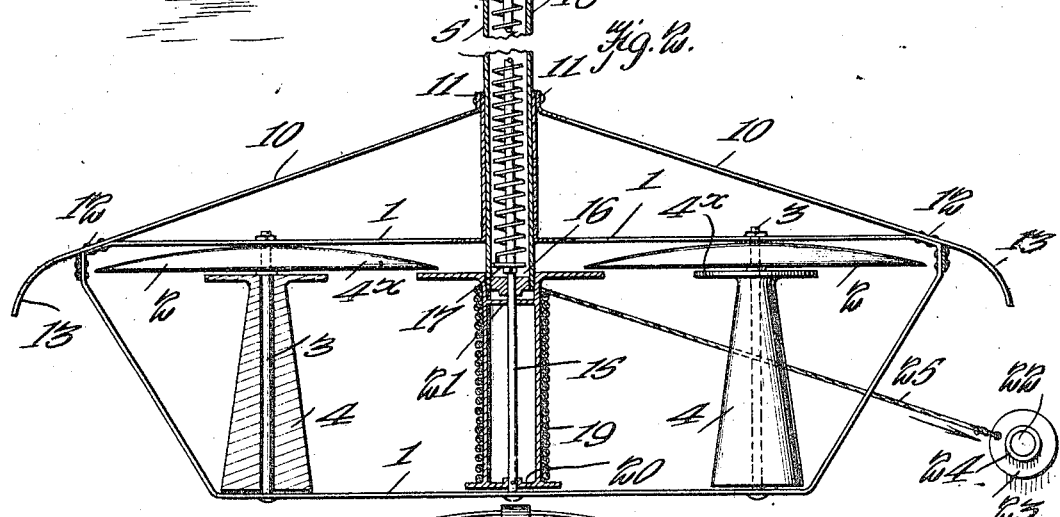
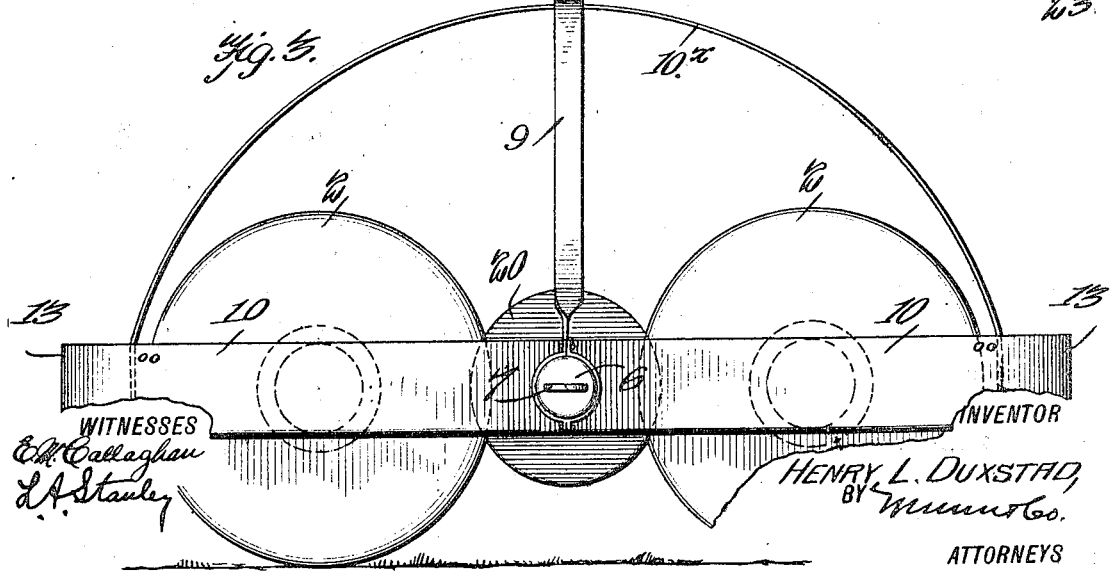
WITNESSES
E. M. Callaghan
L. A. Stanley
INVENTOR
HENRY L. DUXSTAD,
BY Munn & Co.
ATTORNEYS

UNITED STATES PATENT OFFICE.

HENRY L. DUXSTAD, OF CAMBRIDGE, WISCONSIN.

TETHER.

1,060,439.  Specification of Letters Patent.  Patented Apr. 29, 1913.

Application filed August 7, 1912. Serial No. 713,879.

*To all whom it may concern:*

Be it known that I, HENRY L. DUXSTAD, a citizen of the United States, and a resident of Cambridge, in the county of Dane and State of Wisconsin, have made certain new and useful Improvements in Tethers, of which the following is a specification.

My invention relates to improvements in tethers and it consists in the combinations, constructions, and arrangements herein described and claimed.

An object of my invention is to provide a device by means of which an animal may be tethered to a stake, but which will prevent injury to the animal such as that often occasioned by entanglement with the rope.

A further object of my invention is to provide a device by means of which a rope which forms one of the tethering members may be kept always taut and out of the way of the animal.

A further object of my invention is to provide a device which will prevent the animal from coming too near the tether stake.

Other objects and advantages will appear in the following specification and the novel features of the device will be particularly pointed out in the appended claims.

My invention is illustrated in the accompanying drawings forming part of this application in which—

Figure 1 is a perspective view of the device as applied to an animal; Fig. 2 is an enlarged horizontal section through the device, and Fig. 3 is a side view of the device.

In carrying out my invention, I provide a frame 1 of the shape shown in the drawings. Journaled in the opposite sides of this frame are a pair of wheels 2, having axles 3 upon which is also mounted a roller 4. Each roller is provided with a flange 4$^x$ at one end and has a body portion of a conical shape flaring outwardly from the flanged end toward the opposite end.

At 5 I have shown a hollow tube which is of considerable length—say ten feet. This tube is provided with a cap 6 having a bail or ring 7 to which may be attached a rope 8, the other end of the rope being secured to the animal. Braces 10 are also provided which are secured to the tube 11 and to the frame 1 at 12. These braces are prolonged to form curved hooks 13 whose function will be explained later. A semi-circular brace 10$^x$ is also provided which has the double function of a brace and a handle for transporting the device. A brace 9 extends from the semi-circular members 10$^x$ to the rod 5. At one end of the tube 5 is a screw plug 14 in which is journaled a rod or shaft 15, the opposite end being journaled in the frame 1 (see Fig. 2). The shaft passes through a screw plug 16 in one end of the tube 5, and has secured to it a plate 17 to which one end of a spiral spring 18 is attached. The opposite end of the spiral spring 18 is secured in the plug 14.

A reel 19 is journaled at one end on the end of the tube 5, and at the other end is provided with a closed end 20 which bears on the shaft 15. The reel is provided with an interior flange or partition 21 to which the shaft 15 is firmly attached.

The tether stake 22 may be driven into the ground in the region where the animal is to graze. A ring 23 is provided which the stake passes through. The stake is provided with a head 24 to keep the ring 23 in place.

From the foregoing description of the various parts of the device the operation thereof may be readily understood. A rope 25 is first wound around the reel 19 which may be made large enough to accommodate a rope of any desired length. After winding the rope on the reel, it is attached to the ring 23. As stated above, the animal is attached to the end of the hollow rod 5 by passing a rope 8 through the ring 7. Now as the animal walks away from the stake 22, it drags the device after it, the rope unwinding from the spool or reel 19, the spring 18 winding up meanwhile. As the device is being dragged along it will be turned in a direction at right angles to the wheels 2, but when the animal turns to the right or to the left the wheels will be brought more nearly into alinement with the rope 25. Now as the animal walks nearer the stake 22 the device itself will move toward the stake due to the winding of the rope 25 upon the reel 19 by the spring 18. In order to facilitate the winding of the rope upon the inner end of the reel I provide the conical-shaped guide rollers 4. The device is therefore always out of the animal's way, and cannot be stepped on by the animal. If the animal moves toward the stake, the device will run clear to the latter on the wheels 2, and the hooks 13 will be caused to engage the stake. The animal may walk around the stake, but it cannot get nearer it because of the fact that the hook will simply catch on the stake and the rod 5 will hold the animal from the stake. If the animal walks away from the stake the device will be simply dragged away from the stake, the spring 18 tightening in the meantime.

It will thus be seen that I have provided a device in which the tethering rope is always taut and the means for effecting the tightening of the rope is always out of the way of the animal. Furthermore, the device prevents the animal from reaching the stake since it will always travel toward the stake and hold the animal off at a distance amounting approximately to the length of the arm 5.

I claim:

1. In a device for tethering animals, a tether stake, a tether rope secured thereto, a frame, a spring-actuated reel mounted on said frame, said reel being arranged to receive said tether rope, an arm carried by said frame, and a cord or rope secured to said arm and arranged to engage the animal.

2. In a device for tethering animals, a tether stake, a tether rope secured thereto, a frame, a spring-actuated reel mounted on said frame, said reel being arranged to receive said tether rope, an arm carried by said frame, said arm having an axis parallel with the axis of said reel, a spring carried by said arm for operating said reel, and flexible means secured to the arm at one end and to the animal at the other.

3. In a device for tethering animals, a tether stake, a tether rope secured thereto, a frame, a spring-actuated reel mounted on said frame, said reel being arranged to receive said tether rope, an arm carried by said frame, said arm having an axis parallel with the axis of said reel, a spring carried by said arm for operating said reel, wheels for said frame, the axis of said wheels being parallel with the axis of said reel, and flexible means secured to the arm at one end and to the animal at the other.

4. In a device for tethering animals, a tether stake, a tether rope secured thereto, a frame, a spring-actuated reel mounted on said frame, said reel being arranged to receive said tether rope, an arm carried by said frame, said arm having an axis parallel with the axis of said reel, a spring carried by said arm for operating said reel, wheels for said frame, the axis of said wheels being parallel with the axis of said reel, a guide roller disposed on the axis of each wheel, and flexible means secured to the arm at one end and to the animal at the other.

5. In a device for tethering animals, a tether stake, a tether rope secured thereto, a frame, a spring-actuated reel mounted on said frame, said reel, being arranged to receive said tether rope, an arm carried by said frame, said arm having an axis parallel with the axis of said reel, a spring carried by said arm for operating said reel, wheels for said frame, the axis of said wheels being parallel with the axis of said reel, a guide roller disposed on the axis of each wheel, a hook carried by the frame at each end thereof and arranged to engage the stake, and flexible means secured to the arm at one end and to the animal at the other.

HENRY L. DUXSTAD.

Witnesses:
SOLON C. KEMON,
L. A. STANLEY.